April 20, 1954 W. W. McMULLEN 2,675,886
FILLER PIPE CAP PROVIDED WITH FILTER ASSEMBLY
Filed March 21, 1951
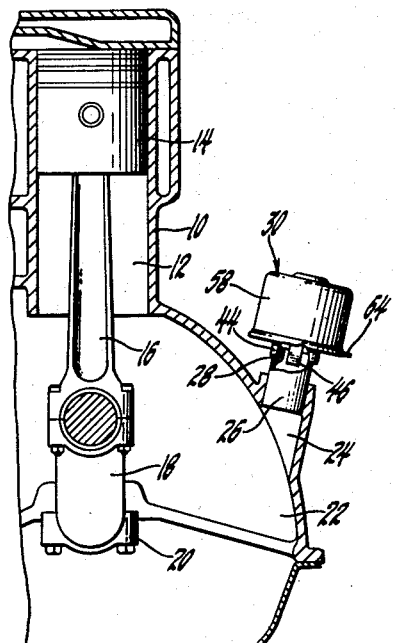
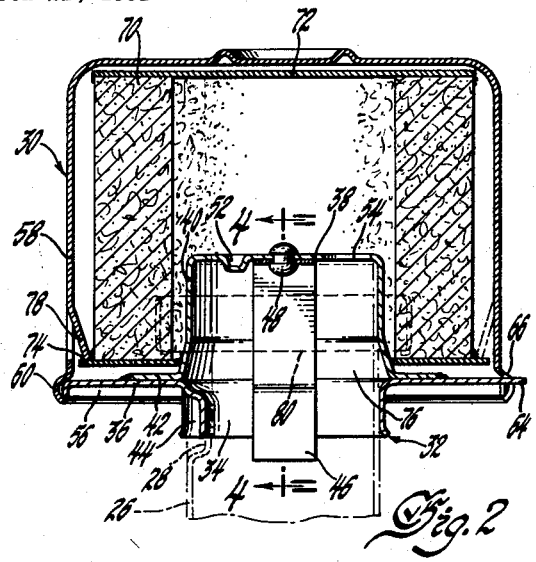
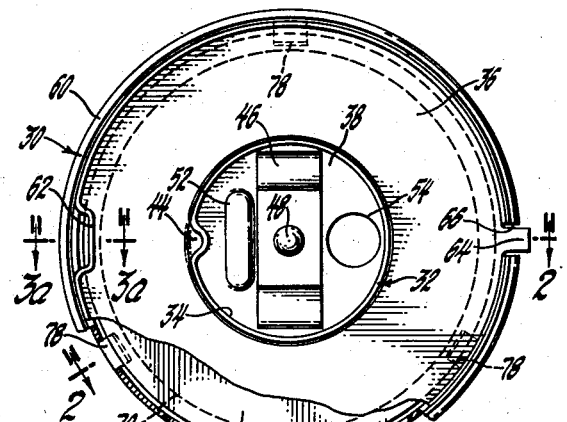
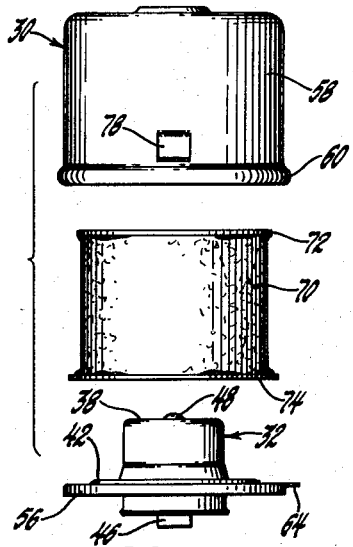
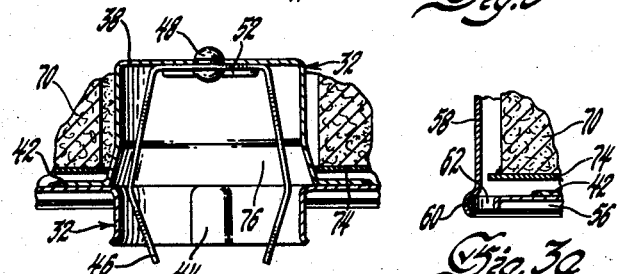
Inventor
Wesley W. McMullen
By Willits, Helwig & Baillio
Attorneys Patented Apr. 20, 1954

2,675,886

UNITED STATES PATENT OFFICE 2,675,886

FILLER PIPE CAP PROVIDED WITH FILTER ASSEMBLY

Wesley W. McMullen, Flint, Mich., assignor to General Motors Corporation, Detroit, Mich., a corporation of Delaware Application March 21, 1951, Serial No. 216,705

15 Claims. (Cl. 183—44)

This invention relates to an improved filter and more particularly to an improved air filter and filler tube cap assembly for the crankcase filler tube of an internal combustion engine.

Though the invention is illustrated in connection with an oil filler tube and cap assembly for an internal combustion engine, it will be appreciated that the invention may be employed in other apparatus where similar problems arise. In many internal combustion engines the filler tube is used both as a tube to supply oil to the crankcase and as a vent to allow air to pass to or from the crankcase. In order to keep the oil in the crankcase clean a filter element is positioned within a housing attached to the filler tube cap in order to remove the dust from the crankcase ventilating air. The filler pipe cap is provided with an annular flange which supports a cup-shaped filter housing. The filter element has a generally annular shape with a disc-shaped top end plate and annular bottom end plate. The cap extends through the annular end plate and within the hollow center of the annular filter element and a conical portion of the cylindrical side wall of the cap engages the inner edge of the annular bottom end plate of the filter element to provide a seal between the cap and the filter element. The cup-shaped filter housing is secured to the annular flange of the cap. A plurality of fingers are stamped from the side wall of the filter housing and bent inwardly to engage the lower end plate of the filter element and hold it in position and in engagement with the sealing surface on the cap. The cap surface above the seal is provided with a suitable aperture for the passage of air and the side wall of the filter housing is also provided with suitable apertures for passage of air.

A primary object of the invention is to provide a simplified and compact crankcase filler tube cap and filter assembly having a removable housing and filter element so that the filter element may be easily replaced.

Another object of the invention is to provide in a crankcase filler tube cap a snap-on housing which secures a filter element in position within the housing and seals the filter element to the housing and cap assembly.

Another object of the invention is to provide in a cap assembly for a crankcase filler and breather tube an annular filter element and housing surrounding and removably secured to the filler and breather tube cap.

Further objects and advantages of the present invention will be more apparent from the following description of the preferred embodiment of the invention as illustrated in the accompanying drawing.

Figure 1 is a partial view with parts in section showing the filler pipe and filler cap assembly mounted on an internal combustion engine.

Figure 2 is a sectional view of the filler cap and filter assembly.

Figure 3 is a bottom view of the filler tube and cap assembly with parts broken away and in section to show suitable details.

Figure 3a is a partial section of Figure 3 on the line 3a—3a.

Figure 4 is a partial section of Figure 2 on the line 4—4.

Figure 5 is a disassembled view showing the parts of the assembly removed from the housing.

The invention is illustrated in conjunction with the conventional automotive internal combustion engine 10. Engines of this type have a number of cylinders 12 in which pistons 14 are reciprocally mounted. The pistons 14 are pivotally connected to the connecting rods 16. The other end of the connecting rods 16 are pivoted to the crankshaft 18 in order to transmit the power to the crankshaft. The crankshaft 18 is rotatably mounted in bearings 20 which are supported on the engine 10 in the crankcase 22. The upper portion of the crank case 22 is provided with an integral outlet pipe 24 which has a filler tube 26 secured therein to provide an accessible opening to supply oil to the crankcase and to permit ventilation air to and from the crankcase. The cap assembly 30 is secured to the filler tube 26 by conventional means such as a slip or bayonet joint. A slip type joint is illustrated in which the filler tube 26 has an axial recess 28 to prevent relative rotary movement of the cap assembly 30 relative to the filler pipe. The cap portion 32 of the filler tube cap and filter housing assembly 30 is formed of a lower part consisting of a cylindrical flange 34 and an annular flange 36 extending from the upper edge of the cylindrical flange and a cup-shaped part consisting of a wall 38, a cylindrical wall portion 40 and an annular face flange 42 extending radially from the lip of the cylindrical portion 40. The annular flange 42 need not be as wide in radial direction as the flange 36. The flanges 42 and 36 are positioned together in contacting relationship with their respective cylindrical flange portions 40 and 34 in axial alignment and extending in opposite directions. The flanges 42 and 36 are secured together by suitable spot or tack welding. The cylindrical flange 34 has suitable abutment 44 which fits in the axial recess 28 to prevent rotation of the cap portion 32. A U-shaped spring member 46 made of spring steel is positioned within the cap and centrally secured to the wall 38 by a rivet 48. The legs of the U-shaped spring member 46 have the bow shape so that their extremities will easily slip into the filler tube and an intermediate portion will contact the inside wall of the filler tube to steady and secure the cap member on the filler pipe. An elongated indentation 52 is provided in the wall 38 adjacent the spring member 46 to prevent rotation of the spring member. The aperture 54 in the wall 38 of the cap portion 32 forms an air passage through the cap.

The outer perimeter of the flange 36 has a generally rounded depending seat flange 56 extending downwardly. A cup-shaped filter housing member 58 has a rounded and slightly extended anchor flange 60 which fits snugly or snaps over the seat flange 56. The inner surface of the anchor flange 60 is concave and engages an outer convex surface on the seat flange. The seat flange 56 on the annular flange 36 is recessed at 62 to provide an opening for a tool to pry off the filter housing 58. Located generally opposite to the recess 62, the flange 36 is provided with a radial extension or a tongue 64 which extends into a slot 66 in the lower portion of the filter housing 58 and prevents relative circumferential movement between the housing 58 and the flange 36.

An annular filter body 70 is positioned within the housing 58 and surrounding the cap member 40. The annular filter body 70 has a top end disc 72 which seals the top of the filter body 70 and the central passage through the annular filter body. The filter body 70 also has a lower end plate of annular form. The cylindrical portion 40 of the cap member has a tapered cylindrical portion 76 adjacent the flanges 42 and 36. The tapered portion 76 has a diameter at the upper end smaller than the inner diameter of the annular end plate 74 and a diameter at the end adjacent the flange 36 larger than the diameter of the inner diameter of the annular end plate 74. Thus when the filter element 70 is pushed over the cap member, it seats and seals on the conical portion 76 of the cap member. The filter body 70 is held in position by a plurality of securing tongues 78 which extend inwardly from the filter housing 58. It will be seen that these integral tongues are formed by cutting U-shaped slots in the filter housing 58 and pushing the metal within the U-shaped cut inwardly to form the tongues. The tongues 78 engage a portion of the lower end plate 74 and hold the filter element 70 in position with the inner edge of the annular end plate 74 in sealing relation with the cap portion 76. In order to provide an air passage in the filter housing 58, a suitable air aperture 80 is provided in the housing 58. It will be appreciated that this air passage may be provided by an aperture or by suitable louvres formed by cutting slits in the housing 58 and displacing the edges slightly.

Though it is believed that the operation and function of the filler cap and filter assembly will be clear from the above description of the mechanical structure and features, it is believed desirable to briefly outline the operation and function of the invention. The cap and filter housing assembly is secured to the upper end of the filler tube 26 in the conventional manner. The alignment member 44 on the cap portion 32 of the assembly enters the recess 28 on filler tube 26. Thus when the cap member is positioned on the filler tube 26, the interengaging alignment member 44 and the recess 28 prevent relative rotation of the filler pipe and cap and filter assembly 30 and position vent aperture 80 on the rear side of the housing. The cap assembly 30 is pushed on the filler tube until the wall 38 of the cap portion 32 engages the top of the filler tube 26. The internal spring member 46 assists in guiding and positioning the cap on the filler tube and by frictional contact with the inner wall of the filler tube frictionally secures the cap assembly in place. When the cap is in position, a ventilation passage is provided through the filler tube and the aperture 54 in the wall 38 of the cap and through the filter element 70 to the space within the filter housing 58. The filter housing 58 is connected to the atmosphere by the large aperture or vent opening 80 in its side wall. Thus all crankcase ventilating air passes through the filter to remove the dirt. In order to pour oil through the filler tube 26 to the crankcase 22, the filler cap and filter housing 58 are removed as a unit in a conventional manner. However, the filter housing 58 is readily detachable from the filler cap portion or structure 32 so that a used filter may be readily removed and a new filter element 70 inserted. In order to remove the filter housing 58 from the cap portion 32, a screw driver or similar tool is inserted in the recess 62 and pried upwardly. This will force the flange 60 of the filter housing 58 away from the seat flange 56 on the annulus 36. Then the old filter element is removed and a new unit 70 inserted with the inner periphery of the annular end plate 74 engaging the tapered portion 76 of the cap portion 32 to provide a seal between the cap and the filter element 70. Then the filter housing 58 is replaced over the filter element 70 with the resilient fingers 78 engaging the lower edge of the bottom filter plate 70 to hold the bottom plate in position against seal 76 and to prevent movement of the filter 70. The interengagement of the tongue 64 and slot 66 prevents relative rotation of the filter housing 58 and cap portion 32.

For convenience in this specification, terms such as "top" and "bottom" and "upwardly" and "downwardly" have been used to describe the relationship of certain features of the invention. It will be seen that these terms are used with reference to the specific embodiment of the invention which is illustrated in a vertical position. It will be appreciated that the filler cap filter may be used in any position such as horizontal or inverted and that the terms are thus intended to conveniently define the relation of the parts relative to each other.

The detailed description of a preferred embodiment of the invention is not to be considered to limit the invention since many modifications of the structure may be made by those skilled in the art within the scope of the invention as defined in the appended claims.

I claim:

1. In a filler pipe cap and filter assembly, a cap having an internal cylindrical wall extending substantially the length of the cap receiving the free end of a filler pipe, a flange extending from said cap, a filter housing, securing means to secure said filter housing to said flange, a filter element having an internal cavity positioned over said cap, said cap having means engaging the filter element to seal the filter element to said cap, a member on said filter housing engaging and holding said filter element in position, and an aperture in said cap to provide an air passage from the inside of said cap through said filter element to the atmosphere.

2. In a filler pipe cap and filter assembly, a cap member, a flange extending from said cap, a filter housing, resilient detachable securing means to secure said filter housing to said flange, a filter element having an internal cavity positioned over said cap, said cap having means above said flange engaging the filter to seal the filter to said cap, a member on said filter housing engaging and holding said filter in position, and means in said assembly to provide an air passage from the inside of said cap through said filter to the atmosphere.

3. In a filler pipe cap and filter assembly, a cap member, a flange extending from said cap, a filter housing, securing means to secure said filter housing to said flange, a filter element having an internal cavity positioned over said cap, said cap having a tapered side wall portion above said flange engaging said filter at the edge of said cavity to seal the filter to said cap, a tongue on said filter housing engaging and holding said filter in position, and means in said assembly to provide an air passage from the inside of said cap through said filter to the atmosphere.

4. In a filler pipe cap and filter assembly, a cap member, a flange extending from said cap, a filter housing, securing means to secure said filter housing to said flange, an annular filter element having a closed top and having a bottom with an aperture fitting over said cap, said cap having a tapered side wall portion above said flange engaging the edge of said bottom about the aperture to seal the filter to said cap, a tongue on said filter housing engaging and holding said filter in position, and means in said assembly to provide an air passage from the inside of said cap through said filter to the atmosphere.

5. In a filler pipe cap and filter assembly, a cap member, a flange extending from said cap, a filter housing, securing means to secure said filter housing to said flange, an annular filter element having a closed top and having a bottom with an aperture fitting over said cap, said cap having a tapered side wall portion above said flange engaging the edge of said bottom about the aperture to seal the filter to said cap, a securing member on said filter housing engaging and holding said filter in position, and means in said assembly to provide an air passage from the inside of said cap through said filter to the atmosphere.

6. In a filler pipe cap and filter assembly, a cap member, means to secure said cap on a filler pipe, a flange extending from said cap, a filter housing, securing means to secure said filter housing to said flange, an annular filter element having a closed top and having a bottom with an aperture fitting over said cap, said cap having a tapered side wall portion above said flange engaging the inner edge of said bottom to seal the filter to said cap, a securing member on said filter housing engaging and holding said filter in position, and means in said assembly to provide an air passage from the inside of said cap through said filter to the atmosphere.

7. In a filler pipe cap and filter assembly, a cap member having a cylindrical side wall extending substantially the full length of the cap to receive a filler pipe, means to secure said cap to a filler pipe, a flange extending from the side wall of said cap, a filter housing secured to said flange, an annular filter element having a top filter disc to seal the top of the filter and the central passage therein and a bottom filter plate of annular form fitting over said cap, said cap having an upwardly inwardly tapering side wall portion above said flange engaging the inner edge of said annular bottom plate to seal the filter to said cap, a tongue on said filter housing extending downwardly and engaging said bottom plate to hold the filter in position on said tapering side wall portion, and means to permit passage from the inside of said cap through said filter to the atmosphere.

8. In a filler pipe cap and filter assembly, a cup-shaped cap, means to secure said cap to a filler pipe, an annular flange extending radially from said cap, said flange having a rounded lip extending perpendicular to said annular flange, a cup-shaped filter housing member having a rounded recess adjacent its edge to fit over the rounded lip to secure the filter housing in position on said cap, an annular filter element having a top filter disc to seal the top of the filter and the central passage therein and an annular bottom plate fitting over said cap, said cap having an upwardly inwardly tapering slide wall portion above said flange engaging the inner edge of said annular bottom plate to seal the filter to said cap, a tongue on said filter housing extending downwardly and engaging said bottom plate to hold the filter in position on said tapering side wall portion, and an aperture in said cup-shaped cap in said assembly to provide an air passage from the inside of said cap through said filter to the atmosphere.

9. In a filler pipe cap and filter assembly, a cup-shaped cap, means to secure said cap to a filler pipe, an annular flange extending from said cap, a cup-shaped filter housing, securing means to secure said filter housing to said annular flange, an annular filter element having a top filter disc to seal the top of the filter and the central passage therein and a bottom filter plate of annular form fitting over said cap, said cap having an upwardly and inwardly tapering side wall portion engaging the inner edge of said annular bottom plate to seal the filter to said cap, a tongue on said filter housing extending downwardly and engaging said bottom plate to hold the filter in position on said tapering side wall portion, and an aperture in said cup-shaped cap in said assembly to provide an air passage from the inside of said cap through said filter to the atmosphere.

10. In a filler pipe cap and filter assembly, a cup-shaped cap member having a side wall, means to secure said cap to a filler pipe, an annular flange extending radially from the side wall of said cap, said flange having a rounded lip extending perpendicular to said annular flange, a cup-shaped filter housing member having a rounded recess adjacent its edge to fit over the rounded lip to secure the filter housing in position on said cap, means to prevent rotation of said filter housing with respect to said annular flange, a recess in the periphery of said annular flange for the insertion of a prying tool to remove the filter housing, an annular filter element having a top filter disc to seal the top of the filter and the central passage therein and a bottom filter plate of annular form fitting over said cap, said cap having a tapered side wall portion engaging the inner edge of said annular bottom plate to seal the filter to said cap, a tongue on said filter housing engaging said bottom plate to hold the filter in position on said tapered side wall portion, an aperture in said cap above said seal to provide an air passage, and an aperture in said filter housing to provide an air passage.

11. In a filler pipe cap and filter assembly, a cup-shaped cap member, means to secure said cap to a filler pipe, an annular flange extending radially from said cap, said flange having a rounded lip extending perpendicular to said annular flange, a cup-shaped filter housing member having a rounded recess adjacent its edge to fit over the rounded lip to secure the filter housing in position on said cap, an annular filter element having a top filter disc to seal the top of the filter and the central passage therein and a bottom filter plate of annular form fitting over said cap, said cap having a tapered side wall portion engaging the inner edge of said annular bottom plate to seal the filter to said cap, a tongue on said filter housing engaging said bottom plate to hold the filter in position against said tapered side wall portion, an aperture in said cap above said seal to provide an air passage, an aperture in said filter housing to provide an air passage, and a U-shaped spring secured to said cap to guide and hold the cap in position.

12. In a filler pipe cap and filter assembly, a cup-shaped cap member having a side wall, means to secure said cap to a filler pipe, an annular flange extending radially from the side wall of said cap, said flange having a rounded lip extending perpendicular to said annular flange, a cup-shaped filter housing member having a rounded recess adjacent its edge to fit over the rounded lip to secure the filter housing in position on said cap, means to prevent rotation of said filter housing with respect to said annular flange, a recess in the periphery of said annular flange for the insertion of a prying tool to remove the filter housing, an annular filter element having a top filter disc to seal the top of the filter and the central passage therein and a bottom filter plate of annular form fitting over said cap, said cap having a tapered side wall portion engaging the inner edge of said annular bottom plate to seal the filter to said cap, a tongue on said filter housing engaging said bottom plate to hold the filter in position against said tapered side wall portion, an aperture in said cap above said seal to provide an air passage, an aperture in said filter housing to provide an air passage, and a U-shaped spring secured to said cap to guide and hold the cap in position.

13. In a filter assembly for use on a pipe end, a cup member having a side wall portion constructed to fit over the end of a pipe and an opened base portion, a filter enclosure having an annular flange and a housing cap member, said annular flange surrounding and secured to the side wall of said cup member, said cup member having a side wall portion tapering inwardly from said flange toward said base portion, a filter element having a base portion and a filter portion, said base portion having a central aperture, said filter portion being secured and sealed to said base portion all around said aperture and completely covering said aperture, said filter portion having an internal cavity opposite said aperture to receive said cup member, said filter element being positioned over said cup member with the edge of said aperture engaging said tapered side wall portion, said housing cap member fitting over said filter element, means to secure said housing cap member to said annular flange to form said filter enclosure, an opening in said filter enclosure providing a fluid passage, and means on said housing cap member engaging said base portion to hold the edge of said aperture engaging said tapered side wall portion to seal the filter element to said cup member.

14. A filter assembly comprising an inverted cup-shaped cap with a wall thereof having an aperture, said cap having a tapered portion with a flange extending radially therefrom and being adapted to be telescopically mounted on the end of a conduit such as an engine breather pipe, a filter element fitted around said cap and in sealing contact with said tapered portion, a housing mounted on and cooperating with said flange to confine said filter element, and an opening in one side of said housing, the arrangement of parts being such that a passage for fluid flow is provided from within said cap and through said aperture and said filter element to said opening.

15. A filter assembly comprising an inverted cup-shaped cap with a wall thereof having an aperture, said cap having a sealing portion with a flange extending radially from said sealing portion and being adapted to be telescopically mounted on the end of a conduit such as an engine breather pipe, a U-shaped spring secured to said cap to guide and hold said cap in position on said pipe, a filter element fitted around said cap and in contact with said sealing portion, a housing mounted on and cooperating with said flange to confine said filter element, said housing being of sufficient size to provide a space between said filter element and said housing and around said filter element, and an opening in said housing, the arrangement of parts being such that a passage for fluid flow is provided leading through said cap, said aperture, said filter element, said space, and said opening.

References Cited in the file of this patent

UNITED STATES PATENTS

| Number | Name | Date |
|---|---|---|
| 839,297 | Kennedy et al. | Dec. 25, 1906 |
| 1,876,368 | Walton | Sept. 6, 1932 |
| 2,064,207 | Jacobs | Dec. 15, 1936 |
| 2,137,054 | Kamrath | Nov. 15, 1938 |
| 2,247,786 | Riddle | July 1, 1941 |
| 2,459,428 | Jacobi | Jan. 18, 1949 |